United States Patent [19]

Collins

[11] 4,128,195

[45] Dec. 5, 1978

[54] EMERGENCY BUMPER AND BIKE RACK

[76] Inventor: Melvin Collins, 907 Meadbrook St., Carson, Calif. 90746

[21] Appl. No.: 792,420

[22] Filed: Apr. 29, 1977

[51] Int. Cl.² .............................................. B60R 9/10
[52] U.S. Cl. .............................. 224/42.03 B; 211/17
[58] Field of Search .................. 224/42.03 B, 42.03 R, 224/42.03 A, 42.04, 42.43; 214/450; 280/402, 502; 211/17–22; 293/69 R

[56] References Cited

U.S. PATENT DOCUMENTS

| | | | |
|---|---|---|---|
| 2,379,994 | 7/1945 | Schwinn | 224/42.03 B |
| 3,847,317 | 11/1974 | Raff et al. | 224/42.03 B |
| 4,046,273 | 9/1977 | Hughes | 224/42.03 B |

*Primary Examiner*—Trygve M. Blix
*Assistant Examiner*—Jerold M. Forsberg
*Attorney, Agent, or Firm*—Daniel Jay Tick

[57] ABSTRACT

A rack mountable on the bumper of an automotive vehicle comprises a first frame for clamping onto the bumper of the vehicle. The first frame includes two vertical members interconnected by two horizontal members. Part of the vertical members is formed to conform to the bumper. Hook bolts and associated fasteners are provided to secure the first frame to the bumper. A separate second frame is slidably mounted on the first frame and extends upwardly therefrom. The second frame is adapted to carry a bicycle. The second frame comprises a pair of parallel U-shaped frames, having adjacent open ends with one frame overlapping the other. The U-shaped frames are connected to each other with a distance therebetween. One of the U-shaped frames has a closed end provided with more than one member extending therefrom transversly to the plane of the frame. The member has bumps formed therein for retaining a bicycle thereon.

2 Claims, 6 Drawing Figures

EMERGENCY BUMPER AND BIKE RACK

BACKGROUND OF THE INVENTION

1. Field of the Invention

This invention relates to automotive bumper attachments and, particularly, to bike racks.

2. Description of the Prior Art

In recent years, automobile bumper attachments have proliferated. A number of bike racks supported by the bumper have been disclosed including Schwinn in U.S. Pat. No. 2,379,994, Danon in U.S. Pat. No. 3,927,810, McLain in U.S. Pat. No. 3,877,622 Chandler in U.S. Pat. No. 3,891,132 Gothrop in U.S. Pat. No. 3,924,787, and Glover in U.S. Pat. No. 3,923,219.

None of the prior art is so simple as applicant's nor does it permit easy bike rack removal.

An object of the invention is to overcome the limitations and disadvantages in the bumper bike racks of the prior art and currently available in the market.

Another object of the invention is to provide a bumper bike rack embodying improved principles of design and construction. Still another object of the invention is to provide a bumper bike rack which is comprised of a minimum number of simple durable parts or components which can be economically manufactured and readily assembled.

Yet another object of the invention is to provide a bumper bike rack device, so designed and constructed that it can be readily installed on almost any typical bumper now in use.

Another object of the invention is to provide an easily removable bike rack.

A further object of the invention is to provide a clamp-on removable bumper extension.

BRIEF SUMMARY OF THE INVENTION

The emergency bumper and bike rack of the invention comprises a clamp-on bumper rack having hook bolts and soft rubber pads and a bike rack of spaced U-frames and bike mounting extensions slidably mounted on the bumper rack.

BRIEF DESCRIPTION OF THE DRAWINGS

In order that the invention may be readily carried into effect, it will now be described with reference to the accompanying drawings, wherein.

DETAILED DESCRIPTION OF THE INVENTION

Figure 1:
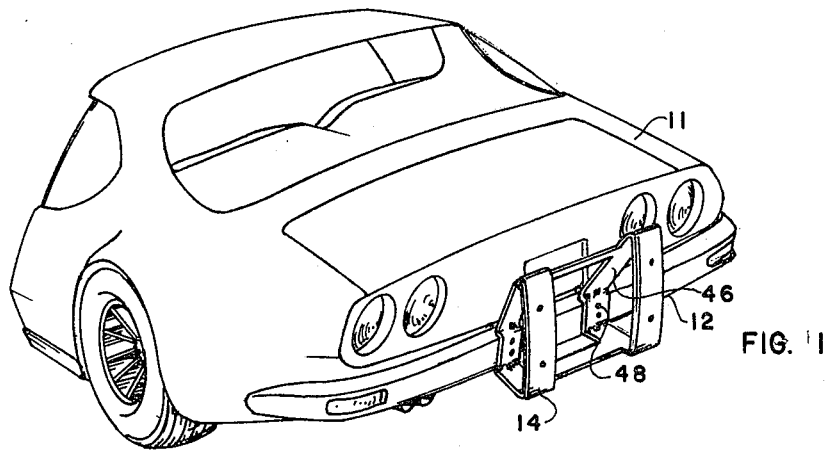
FIG. 1 is a perspective view of an embodiment of the bumper rack of the invention installed on the rear bumper of a car.
Figure 2:
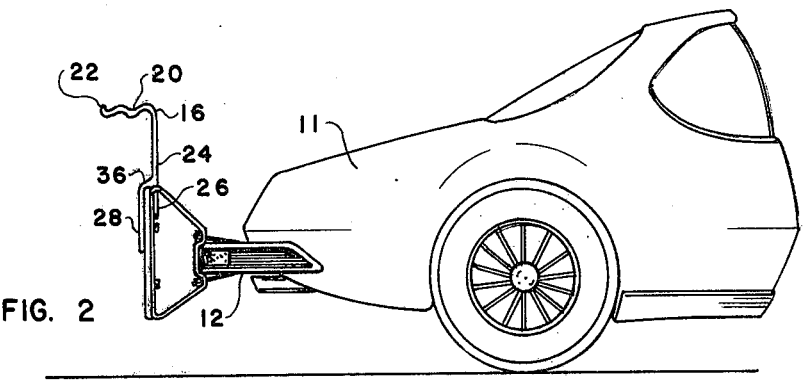
FIG. 2 is a side elevation showing an embodiment of the bike rack of the invention installed on the bumper rack of FIG. 1.

An emergency bumper 14 and bike rack 24 of the invention is installed on the rear bumper 12 of a typical automobile 11 and clamped and secured thereto by at least two hook bolts 50, 52. The hook bolts 50, 52 have washers and nuts 54 to tighten the bumper rack 14 to the bumper 12. The bumper rack 14 comprises at least two vertical triangles 46 interconnected by horizontal members 42 and 44. Soft rubber pads 38 are affixed to the external vertical members 56 to reduce scratching and denting of adjacent objects.

Parts 48 and 49 of the bumper rack are indented to conform to the bumper and are affixed to each other by bolts 47.

Figure 3:
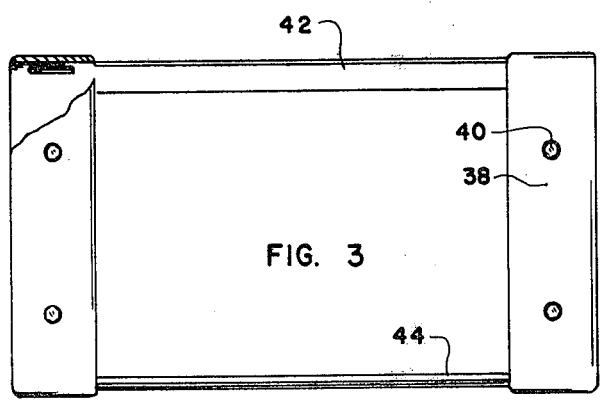
FIG. 3 is a rear view on an enlarged scale of the bumper rack of FIG. 1.
Figure 4:
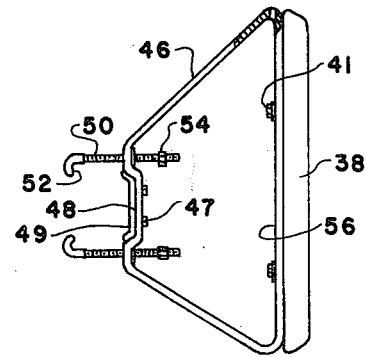
FIG. 4 is a side view of the bumper rack of FIG. 3.
Figure 5:
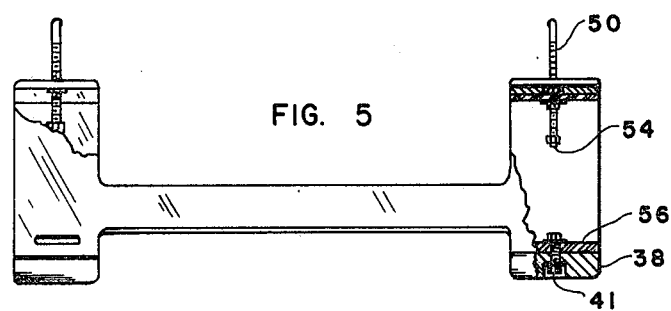
FIG. 5 is a top view, on an enlarged scale, partly cut away and partly in section, of the bumper rack of FIG. 3.

Holes 40 are formed through the bumper rack (FIG. 3).

Figure 6:
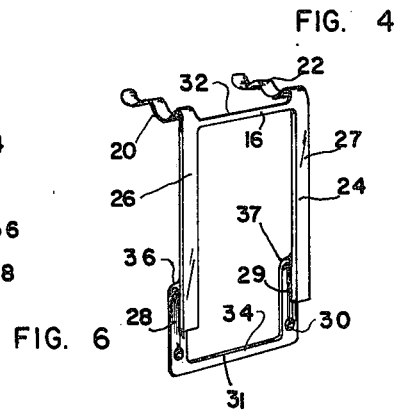
FIG. 6 is a perspective view, on an enlarged scale, of the bike rack of the invention.

A bicycle rack 24 slidably mounted on to the bumper rack 14 by positioning the upper horizontal member 42 of said bumper rack in the space between two parallel frames 32 and 34 of said bicycle rack (FIG. 6). The frame 32 has a pair of substantially parallel transversely extending members 22 and 20 for mounting a bicycle. The frame 34 is optionally provided with holes 30 for accomodating fasteners to secure the bike rack 24 to the bumper rack 14. The substantially U-shaped frame 32 has legs 26 and 27 and a crossbar 16 joining said legs. The substantially U-shaped frame 34 has legs 28 and 29 and a crossbar 31 joining said legs. The legs 28 and 29 of the frame 34 of the bicycle rack are bent at their free ends 36 and 37, respectively, and secured to the legs 26 and 27, respectively, of the frame 32, as shown in FIG. 6.

An advantage of the invention is to provide a bumper bike rack which having a minimum number of simple durable parts or components which can be economically manufactured and readily assembled.

Another advantage of the invention is to provide a bumper bike rack device, so designed and constructed that it can be readily installed on almost any typical bumper now in use.

Another advantage of the invention is to provide an easily removable bike rack.

A further advantage of the invention is to provide a clamp-on removable bumper extension.

The invention includes all novelty residing in the description and drawings. It is obvious to those skilled in the art that various minor changes can be made without departing from the concept of this invention and all such as fall within the reasonable scope of the appended claims are included.

What is claimed is:

1. A rack mountable on the bumper of an automotive vehicle, said rack comprising a first frame for clamping onto the bumper of a vehicle, said first frame including two vertical members interconnected by two horizontal members, part of the vertical members being formed to conform to the bumper and being provided with hook bolts and associated fasteners to secure said first frame to the bumper; and a separate second frame slidably mounted on the first frame and extending upwardly therefrom, said second frame being adapted to carry a bicycle, said second frame comprising a pair of substantially parallel substantially U-shaped frames having adjacent open ends with one frame overlapping the other, said U-shaped frames being connected to each other with a distance therebetween, one of said U-shaped frames having a closed end provided with more than one member extending therefrom transversely to the plane of said frame, said members having bumps formed therein for retaining a bicycle thereon.

2. A rack, as in claim 1, wherein the other U-shaped frame has holes formed therein for accommodating fasteners for affixing said second frame to the first frame.

* * * * *